(12) United States Patent
Prayaga et al.

(10) Patent No.: US 11,416,568 B2
(45) Date of Patent: *Aug. 16, 2022

(54) MOBILE CONTENT ATTRIBUTE RECOMMENDATION ENGINE

(71) Applicant: mPulse Mobile, Inc., Encino, CA (US)

(72) Inventors: Ram Sanyasi Prayaga, Woodland Hills, CA (US); Rena Brar Prayaga, Woodland Hills, CA (US); Christopher Joseph Nicholson, Westlake Village, CA (US)

(73) Assignee: mPulse Mobile, Inc., Encino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/674,816

(22) Filed: Nov. 5, 2019

(65) Prior Publication Data

US 2020/0065347 A1 Feb. 27, 2020

Related U.S. Application Data

(63) Continuation of application No. 15/265,767, filed on Sep. 14, 2016, now Pat. No. 10,474,724.

(60) Provisional application No. 62/284,027, filed on Sep. 18, 2015.

(51) Int. Cl.
*G06F 16/95* (2019.01)
*G06F 16/9535* (2019.01)

(52) U.S. Cl.
CPC ................ *G06F 16/9535* (2019.01)

(58) Field of Classification Search
CPC .............. G06F 16/9535; G06F 16/9536
USPC .......................................... 707/706
See application file for complete search history.

(56) References Cited

U.S. PATENT DOCUMENTS

| | | | |
|---|---|---|---|
| 8,010,501 B2* | 8/2011 | Bourdoncle | G06F 16/328 707/673 |
| 8,885,984 B1* | 11/2014 | Lavi | G06F 16/532 707/706 |
| 2003/0126102 A1* | 7/2003 | Borthwick | G06F 16/215 707/E17.079 |
| 2007/0067304 A1* | 3/2007 | Ives | G06F 16/951 |
| 2007/0179971 A1* | 8/2007 | Benson | G06F 16/283 |
| 2008/0033951 A1* | 2/2008 | Benson | G06F 40/186 |
| 2009/0012991 A1* | 1/2009 | Johnson | G06Q 30/0631 |
| 2009/0089332 A1* | 4/2009 | Harger | G06F 40/197 |

(Continued)

*Primary Examiner* — Hanh B Thai
(74) *Attorney, Agent, or Firm* — Jones Day

(57) ABSTRACT

At least one analytical agent extracts a plurality of attributes from each of a plurality of member input vectors. Each member input vector includes raw data characterizing contextual aspects about an associated and different user. Thereafter, a content search vector is generated for each user by the at least one analytical agent that includes the attributes extracted from the member input vector associated with such user and weights corresponding to each attribute that are particular to such user. A search engine, accessing a content library, then matches each content search vector with one of a plurality of content workflows based on both the attributes and weights within such content search vector. A context engine then initiates execution of each matching content workflow which results in tailored messages specified by the matching content workflow being sent to the user associated with the matching content workflow.

27 Claims, 7 Drawing Sheets

(56) References Cited

U.S. PATENT DOCUMENTS

| | | | |
|---|---|---|---|
| 2009/0089630 A1* | 4/2009 | Goldenberg | G06F 16/2462 |
| | | | 714/704 |
| 2011/0016109 A1* | 1/2011 | Vassilvitskii | G06Q 30/02 |
| | | | 707/E17.084 |
| 2011/0106807 A1* | 5/2011 | Srihari | G06F 16/288 |
| | | | 707/E17.046 |
| 2011/0213660 A1* | 9/2011 | Fontoura | G06Q 30/0254 |
| | | | 705/14.52 |
| 2011/0213767 A1* | 9/2011 | Fontoura | G06Q 30/08 |
| | | | 707/E17.014 |
| 2012/0317091 A1* | 12/2012 | Li | G06F 16/9535 |
| | | | 707/E17.089 |
| 2015/0293995 A1* | 10/2015 | Chen | H04N 21/26258 |
| | | | 707/706 |
| 2017/0004531 A1* | 1/2017 | Seetharama | G06Q 30/0256 |

* cited by examiner

MOBILE CONTENT ATTRIBUTE RECOMMENDATION ENGINE

RELATED APPLICATIONS

The current application claims priority to U.S. patent application Ser. No. 15/265,767 filed on Sep. 14, 2016 which, in turn, claims priority to U.S. patent application Ser. No. 62/284,027 filed on Sep. 18, 2015, the contents of both of which are hereby fully incorporated by reference.

BACKGROUND

Enterprises are increasingly interacting with large number of users via messaging. As the populations of users continues to increase, so does the difficulty in individually engaging such users via messaging to adopt or otherwise drive certain actions/behavior. This situation presents a problem of scale in two meaningful ways: complexity and volume. As volume of members increases, it is not possible to cost-effectively support the large population that is presenting vast amounts of data on a continuous basis. The enterprise is not able to have human representatives that can realistically factor in the multitude of data points that are coming in and the volume of data that is being generated by these data sources.

SUMMARY

In one aspect, at least one analytical agent extracts a plurality of attributes from each of a plurality of member input vectors. Each member input vector includes raw data characterizing contextual aspects about an associated and different user. Thereafter, a content search vector is generated for each user by the at least one analytical agent that includes the attributes extracted from the member input vector associated with such user and weights corresponding to each attribute that are particular to such user. A search engine, accessing a content library, then matches each content search vector with one of a plurality of content workflows based on both the attributes and weights within such content search vector. A context engine then initiates execution of each matching content workflow which results in tailored messages specified by the matching content workflow being sent to the user associated with the matching content workflow.

In some variations, the member input vector can be generated for each users. The attributes of the member input vector can be subject to change such that the extracting, generating, matching, and initiating are updated/continually updated to reflect changes in the member input vector. A dimensionality of the member input vector is automatically expanded upon addition of one or more data sources without refactoring other data sources.

A plurality of responses can be received for each user that are responses to tailored messages previously sent to such user. In such cases, computer-implemented natural language processing on the plurality of responses to generate at least a portion of the attributes of each member input vector.

Each content workflow can be stored within a database and they can specify a sequence, modality, and delivery flow of the tailored messages. The modality can include at least one of: short messaging service, multimedia messaging service, application notification, or e-mail message.

There can be a plurality of analytical agents such that at least one analytical agent uses an output of at least one other analytical agent in connection with the extracting and generating. In addition, there can be a plurality of analytical agents that each evaluate only a subset of dimensions of the member input vector and which generate only a different subset of the attributes.

The analytical agents can take many forms. For example, the at least one analytical agent can include a natural language processing agent to extract key topics from a user-generated response and which uses a machine learning model. The at least one analytical agent can include a mapping agent that runs data mapping rules to map data falling within a range into attribute. The at least one analytical agent can include a classification agent using random forests to classify continuous feature vectors with a finite set of classes. The at least one analytical agent can include an emotion recognition agent that takes individual messages and generates an emotional profile of the messages. The at least one analytical agent can include a psychographic monitoring agent that translates user generated self-reports or provided outcomes obtained from external sources to generate a psychographic profile for a user.

In some implementations, a forward index is generated to store a list corresponding to all of the attributes. This forward index can be inverted to result in an inverted index that is used by the search engine to match attributes of the content search vector with attributes of the content workflows.

An activation score can be generated for each attribute in each content search vector. This activation score can be used by the search engine to identify a best matching content workflow.

The tailored messages can pertain to a wide variety of scenarios including a healthcare and/or wellness regimen.

The activation score can be based on a variety of factors. For example, the activation score can be based on a self efficacy score derived from responses by the respective user of self-efficacy assessments. The activation score can be based on a state of change of the respective user. The activation score can be based on a current internal change of the respective user that characterizes actions performed by the respective user in relation to overall behavior change goals. The activation score can be based on a current behavior change of the respective user that characterizes actions performed by the respective user in relation to overall behavior change goals. The activation score can be based on a current engagement level of the respective user characterizing how the user responds to the tailored messages.

It can be determined, for each content search vector, a distance between the content search vector and each of a plurality of content workflows. This distance can be used by the search engine to match a content workflow having a shortest determined distance relative to the corresponding content search vector.

Each content workflow can include a plurality of messages that are each tagged with respective attributes characterizing content of such messages. Each content workflow can include or otherwise specify a content matching algorithm that uses a content search vector that has weights that are determined by a genetic algorithm such that a fitness measure for optimization is the resulting activation score.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the methods, systems, and computer program products provided herein enable dynamic, tailored and large-scale content creation and delivery that maximizes content relevance and increases user activation among a large population. In addition, the current subject matter, in contrast to conventional messaging systems, provides technical advantages by automatically recommending and selecting the most individualized and relevant content in real-time, which increases engagement and promotes positive behavior change among a large population of users.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
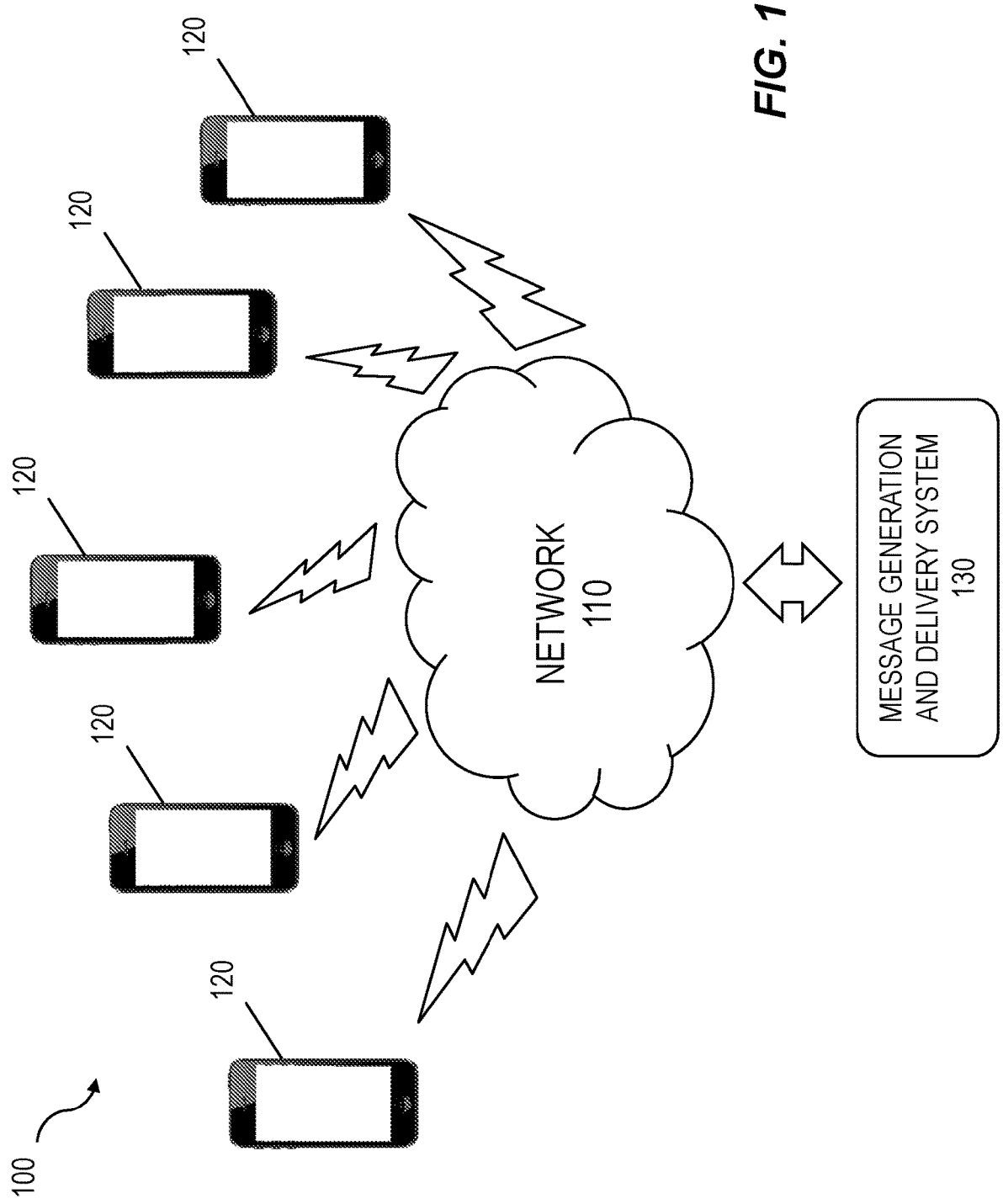
FIG. 1 is a diagram illustrating a computing architecture for distributing tailored messages to a large user population.

With reference to diagram 100 of FIG. 1, the current subject matter is directed to an advanced computing platform including a message generation and delivery system 130 that allows for tailored messages to be sent to and exchanged with a large user population via, for example, various computing device 120 such as mobile phones communicating with the message generation and delivery system 130 via one or more wired/wireless computing networks. In particular, the message generation and delivery system 130 can allow for the combination and visualization of qualitative and quantitative data from disparate sources and systems and allows for a machine learning model to be trained to send tailored messages using a context engine.

The current subject matter can be applied to a wide variety of scenarios in which there is a need to send tailored messages to a large population of members. Examples include: a) a health plan that needs to change member behavior to use lower cost resources (such as Urgent Care or an health advice line) instead of high-cost resources (such as Emergency Room), b) a medical provider that needs to ensure that its patients are adhering to the medication regimen suggested by the doctor; c) a provider that wants to ensure that patient appointments are not missed, or d) a pharmacy system that needs to ensure that its patients refill the prescription on time. Another example for both healthcare context and non-healthcare includes an organization that wants to change members' preferences of getting paper-based mail regarding their benefits or account statements to receiving these communications digitally where members receive these statements in a digital format. For illustration purposes only, references are made herein predominantly to the use of the computing platform in connection with healthcare applications.

Many health plan members, consumers and patients (referred to interchangeably as "members," "consumers," or "patients") seek encouragement, reminders, education, health tips and information and would like to actively engage with mobile solutions to build healthy habits and behaviors. Others are more resistant to change but can still be nudged to take small steps to improve their health with the right support. At the same time, health plans and providers are eager to add innovative mobile health solutions to their existing networks, to reach their patients to track their progress, to provide them with ongoing care, to understand their needs, and to help drive behavior change. The current subject matter leverages behavioral science research to build novel, interactive and intelligent workflows that are tuned to specific conditions (such as diabetes, periodontal disease, asthma, smoking) and uses analytics and algorithms to provide targeted content that matches the needs of consumers and patients based on their specific characteristics and individual data profiles.

The current subject matter relates to an on-going and in-depth analysis of member characteristics and behavior patterns to optimize the relevance of health message content and improve engagement. It can recommend content workflows and can use an algorithm that relies on numerous (e.g., over 100, etc.) attributes to recommend the best content for a specific user at a particular time. The current subject matter uses intelligent algorithms that can map point-in-time data into a search vector that is used to select the best next workflow. The algorithms can be iterative where each successive iteration attempts to increase the member's activation score.

Furthermore, the current subject matter can use natural language processing (NLP) to analyze member responses, and then combines NLP techniques to engage in a more human-centered dialog. NLP, in this regard, can be used to understand unexpected responses that might have the same semantic value as an expected/structured response. In contrast to messaging platforms that use fixed and strict pattern matching rules, the current subject matter allows message content to be dynamically changed if member preferences and behavior fall outside these structured rules.

Figure 2:
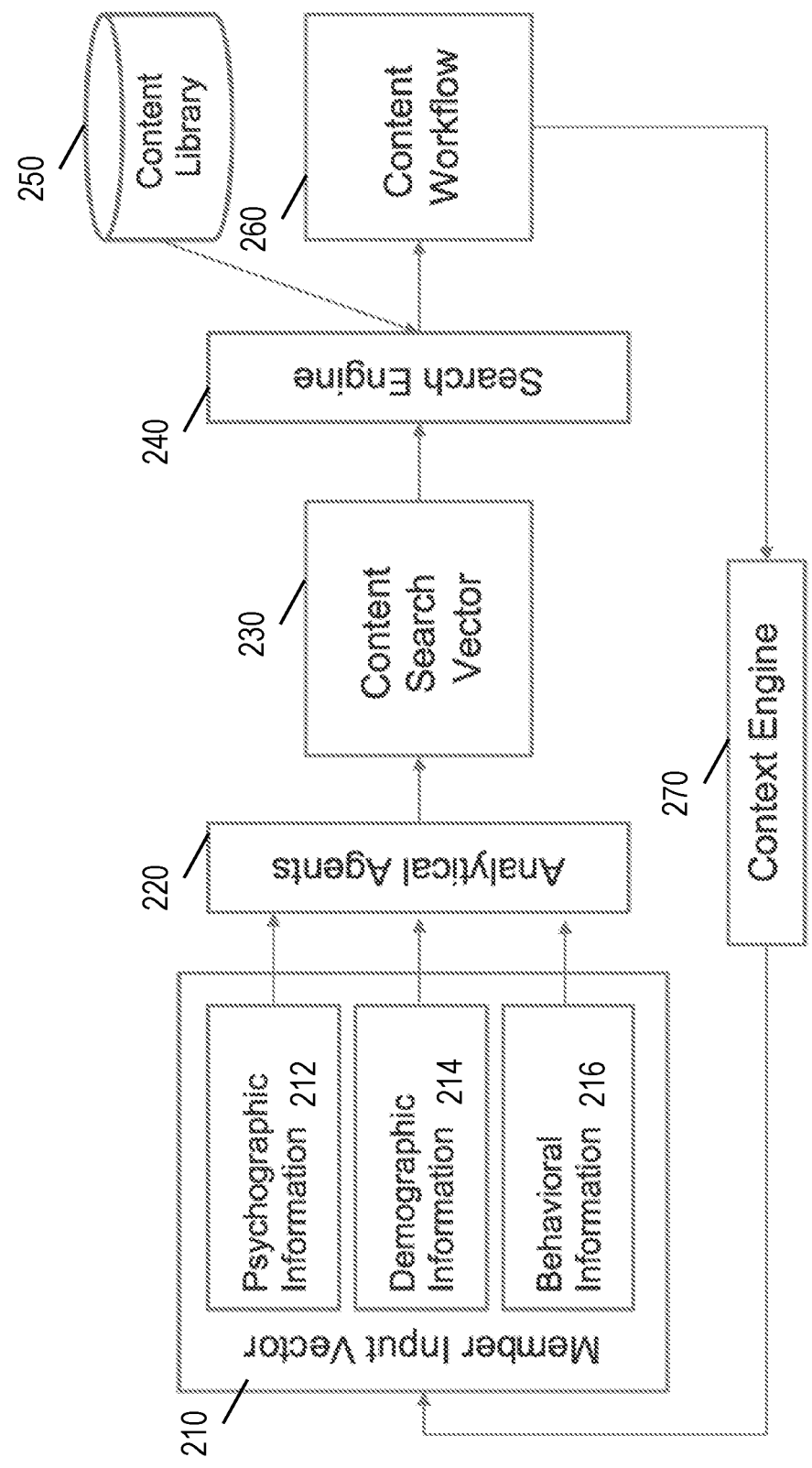
FIG. 2 is a diagram illustrating a system for determining tailored content for inclusion in messages distributed to a large user population.

FIG. 2 is a diagram 200 illustrating aspects of the current computing platform (sometimes referred to herein as the cognitive computing architecture) which can form part of the message generation and delivery system 130 (which in turn can form a plurality of distinct software modules and/or computing systems that can be distributed or form part of a single integrated computer system). The cognitive computing architecture can use individual data processing agents that process incoming stimuli (new data) into a knowledge representation for information retrieval (a content search vector). A member input vector 210 can be a dynamically expanding input vector about a member at a given point-in-time comprising several elements. The member input vector 210 in one example, can be broken into three primary categories: psychographic information 212, demographic information 214, and behavioral information 216. The member input vector 210 can expand in dimensionality when new data sources are made available. This arrangement provides a significant technical advantage over existing platforms in that current platforms assume a fixed input and cannot easily incorporate new data dimensions or sources without significant refactoring. In the subject matter described herein, the architecture is able to dynamically incorporate new input dimensions without refactoring existing input sources. The basis for this capability and advantage is described below.

The member input vector 210 can be processed by analytical agents 220 which are a set of processes whose outputs are combined to generate a content search vector 230. An analytical processing agent 220 can be belong to one of the following types: natural language agents, mapping agents, classification agents, emotion recognition agents, psychographic monitoring agents, and communication agents. These agents will be described in more detail below.

The content search vector 230 can comprise a set of search attributes and their weights. A search vector attribute can be made up of one or more words and is similar to a search term used within a search engine. Each attribute in the content search vector 230 can have a weight that determines the importance of that search attribute within the search.

The content workflow search engine 240 can be an information retrieval system that retrieves the best content workflow by maximizing the match between content workflows stored within a content library 250 and the content search vector 230.

The content library 250 (sometimes referred to as a content workflow library) is a database of content workflows. Each content workflow within the database consists of one or more messages to be delivered to users and rules that dictate the sequence, modality, and flow of these messages. Each workflow also has an indexed list of attributes that are used to match against in the information retrieval task.

The context engine 270 is a complex rules engine that is built to manage and execute a content workflow 260 selected by the search engine 240. A key performance indicator generated by the context engine 270 can be an activation score of the member (as described further below). This score can be calculated by factoring self-efficacy, stage of change, internal change, engagement and behavior change (specifically goal completion).

Input dimensions to the member input vector 210 can comprise numerical (including, date/time), nominal or textual values. The number of dimensions and the sparseness of the dimensions can change over time and the current subject matter is architected to support such an evolving dimensionality. An example set of dimensions is provided below in Table 1.

TABLE 1

| Demographic | Psychographic | Behavioral |
|---|---|---|
| Date of birth | Self-care | Text-Ins - Informational |
| Gender | Social support | Text-Ins - Challenge |
| Zip | Self-efficacy | Time to respond |
| Language | Readiness to change | Length of response |
| Health literacy level | Motivation | Sentiment of response |
| Community need index | Confidence | Frequency of response |
| Marital status | Health beliefs | Tone/style of response |
| Living alone | Stage of change | Engagement |
| Children in household | Stress levels | Last Visit Date |
| Health risks | Activation | Last Visit code |
| Secondary risk factors | Depression | Next Appointment Date |
| Health status | Assessment | Next Visit Code |
| Exercise levels | Lifestyle | |
| Nutrition habits | Values | |
| Weight issues | | |
| Smoker | | |

The analytical agents 220 can be characterized as semi-intelligent agents that process the member input vector 210 to generate the most appropriate search attributes and their corresponding weights. The agent model can be layered in that some agents use the output of other agents to compute their outputs. Such an agent architecture allows for independent processing at scale and supports the easy addition of new input dimensions and attribute generators. Each agent is uniquely developed to evaluate and process only certain dimensions of the input vector and output one or more attributes.

While the calculation is unique, the current subject matter provides for six main types of agents. Furthermore, other types of agents can be utilized in different combinations and interrelationships.

Natural language processing (NLP) agents can be used to extract key topics from a user response using a machine learning model such as support vector machines (SVM). Human categorization would be too time-consuming, costly, and inconsistent, requiring a semi-automatic system of text categorization. The goal of text categorization is the classification of documents into a fixed number of predefined categories. SVM is a supervised learning algorithm that can be used to determine whether the response from the member belongs to multiple categories, a single category, or no category. Linear kernels can be used for the SVM to ensure increased accuracy with small training sets. Most text classification tasks are linearly separable and linear kernels are particularly well suited for text-categorization. Simple linear SVMs also provide good generalization accuracy and are faster to train.

Mapping agents can be agents that run data mapping rules that map data that falls within a range of data values into attributes using data boundary rules. An example of this would be an age mapping agent that maps a member's year of birth (DOB) into attributes based several rules:

IF (CY - 18) > year(DOB)) AND (CY - 13) < year(DOB))
    THEN ADD_ATTRIBUTE("teen")
IF (CY - 30) > year(DOB)) AND (CY - 18) < year(DOB))
    THEN ADD_ATTRIBUTE("young adult")
...
CY - Current Year
year(dob) - Returns the year given a timestamp
add_attribute(search_term) - Function that adds the search_term to the search vector Classification agents can use random forests, a classification algorithm that classifies continuous feature vectors (such as time to respond, length of response, sentiment of response) with a finite set of classes ('slow to respond', 'respond well'). These classification agents can take values from other computed values (such as sentiment) and use them in their calculation. Random forests, in this context, can use an ensemble learning approach and can be used as a powerful predictive algorithm because they average multiple decision trees and thus avoid bias and overfitting. An alternative to using random forest would be to use a Naïve Bayes classifier, especially for smaller models and to get an overview of the data before running the more complex random forest algorithm.

Emotion recognition agents can take individual messages (e.g., text messages, etc.) and generate an emotional profile of the message for further processing. These emotion recognition agents can include sentiment and tone analyzers (using a lexicographic approach) along with general emotion analysis of a member's response.

Psychographic monitoring agents can translate self-report or provided outcomes data from external sources to determine a member's psychographic profile. These agents are interested in the following data sources and related attributes such as, for example, self-care, social support, self-efficacy, readiness to change, motivation, confidence, health beliefs, stage of change, stress levels, activation, lifestyle, and values. The algorithms used by the psychographic monitoring agents can be rule-based and driven by evidence-based protocols and generally accepted models within cognitive and behavioral psychology research such as behavioral science (e.g., stages of change, goal setting, game theory, prospect theory, behavioral economics, adherence models, health belief model, self-efficacy, etc.), evidence-based clinical protocols (e.g., diabetes management protocols, smoking cessation programs, periodontal disease management, etc.) and population health management (e.g., patient activation model, wellness programs, etc.).

Figure 3:
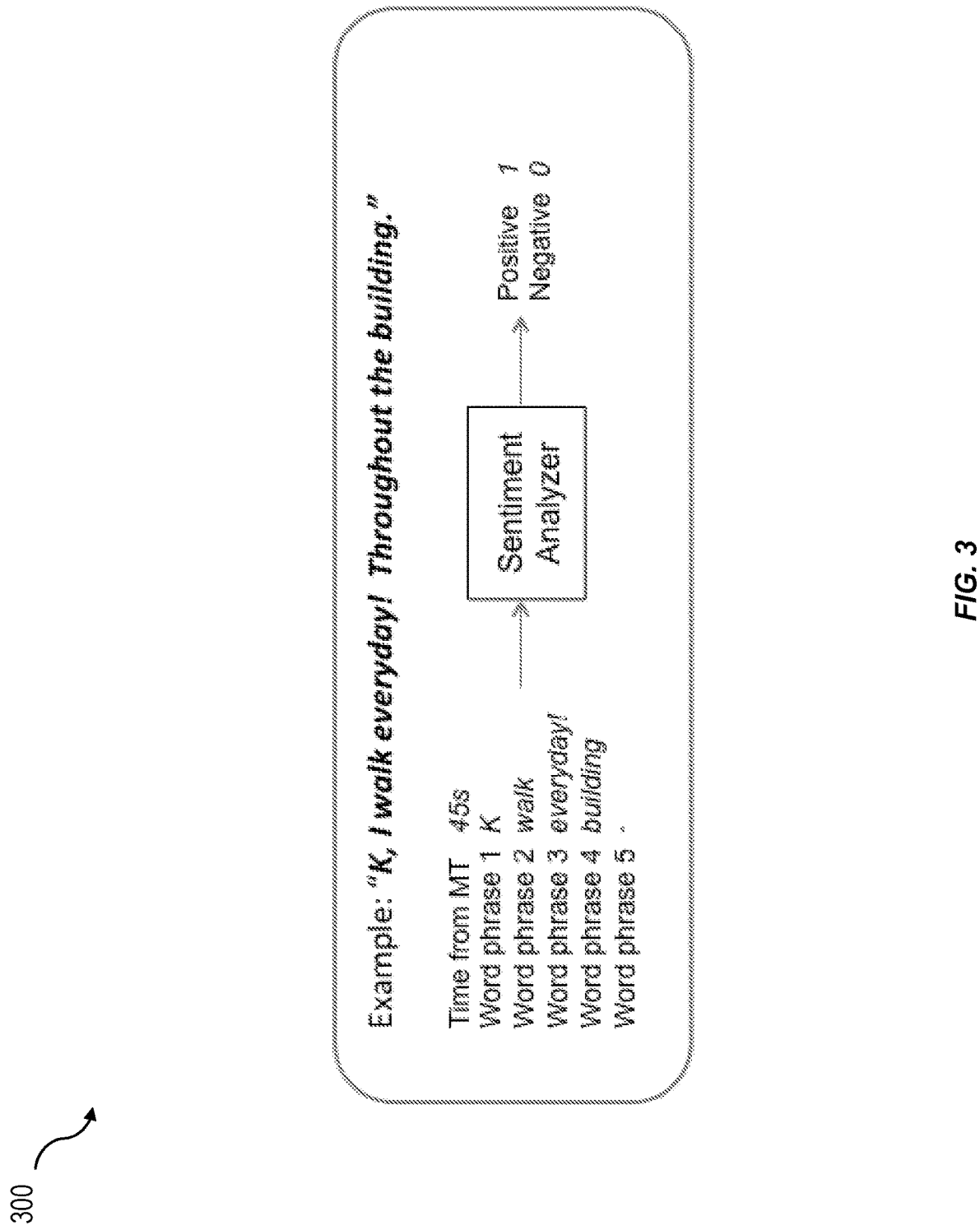
FIG. 3 is a diagram illustrating a sentiment analyzer for generating a sentiment score.

FIG. 3 is a logic diagram 300 illustrating an example psychographic monitoring agent that can provide a sentiment score based on text mining and sentiment analysis of words and phrases in message responses received by the message generation and delivery system 130 from the computing devices 120 over the network 110. The purpose of the sentiment analyzer can be to extract a sentiment score for each response in order to better understand how people are reacting to these messages (e.g., messages sent by SMS or MMS, etc.) by studying the polarity or valence of their responses. The sentiment score can be compiled using a hybrid two-step approach that combines matching algorithms with classification algorithms. In step one, an unsupervised matching model can extract terms used in text messages and matches them to a health care specific lexicon of known words and phrases. The lexicon-based approach involves calculating orientation for a document from the semantic orientation of words or phrases in the document.

Figure 4:
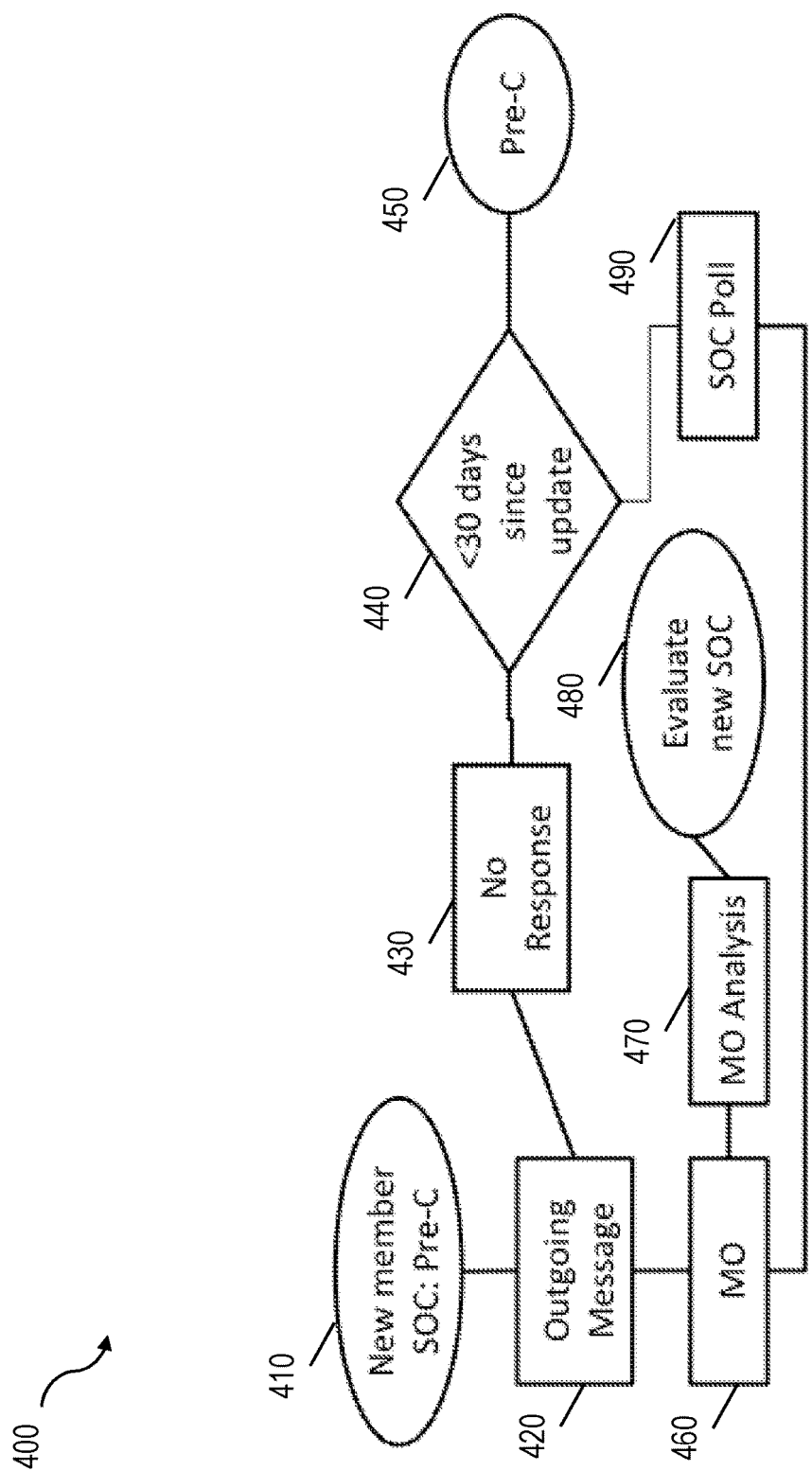
FIG. 4 is a process flow diagram for providing a stage of change estimator that can determine to which of the six Stages of Change a member belongs.

In step two, a supervised classification model can use training data to recognize and predict polarity for unseen terms drawn from a large annotated corpus. Together, these two models can capture the tone of member responses as well as the emotional trajectory on an individual member level, on an aggregate member level, for a particular health or wellness campaign, and over time. The text classification approach can use statistical or machine-learning (SVM) models and involves building classifiers from labeled instances of texts or sentences. The classifiers can be trained on data sets using unigrams or bigrams FIG. 4 is a flow diagram 400 illustrating an example of another monitoring agent that can be used to determine a member's stage of change. As part of the current subject matter, this algorithm can be used to assess a member's "stage of change" using a transtheoretical change model (Prochaska & DiClemente, 1983). The stages of change include Precontemplation, Contemplation, Preparation, Action, Maintenance, and Relapse. Stage of change is assessed through a refined and shorter version of the Processes of Change Questionnaire using a five-point Likert format. Assessment dialog workflows (a form of content workflow that is focused on assessment) can be developed and used to assess a member's stage of change. The data from these assessments can be used in the process described within the flow diagram 400 to determine the member's Stage of Change (SOC). For a new member, the SOC is not yet known and the member is assigned the Precontemplation SOC 410, which can result in an outgoing message being sent 420 that elicits a response. This message can be a regular campaign message and the member is expected to respond (MO) 460 and the response can be processed for SOC indicators within the MO analysis process 470 and, based on this analysis, a new SOC 480 can be assigned. Within a predefined period of time (e.g., 30 days, etc.) of non-response, messages can be sent to the member that comprise an SOC Poll (a specific Stage of Change assessment) 490 to explicitly determine the member's SOC. However, if the member does not respond 430, after 30 days, the member can be automatically assigned or kept on the Precontemplation stage.

Figure 5:
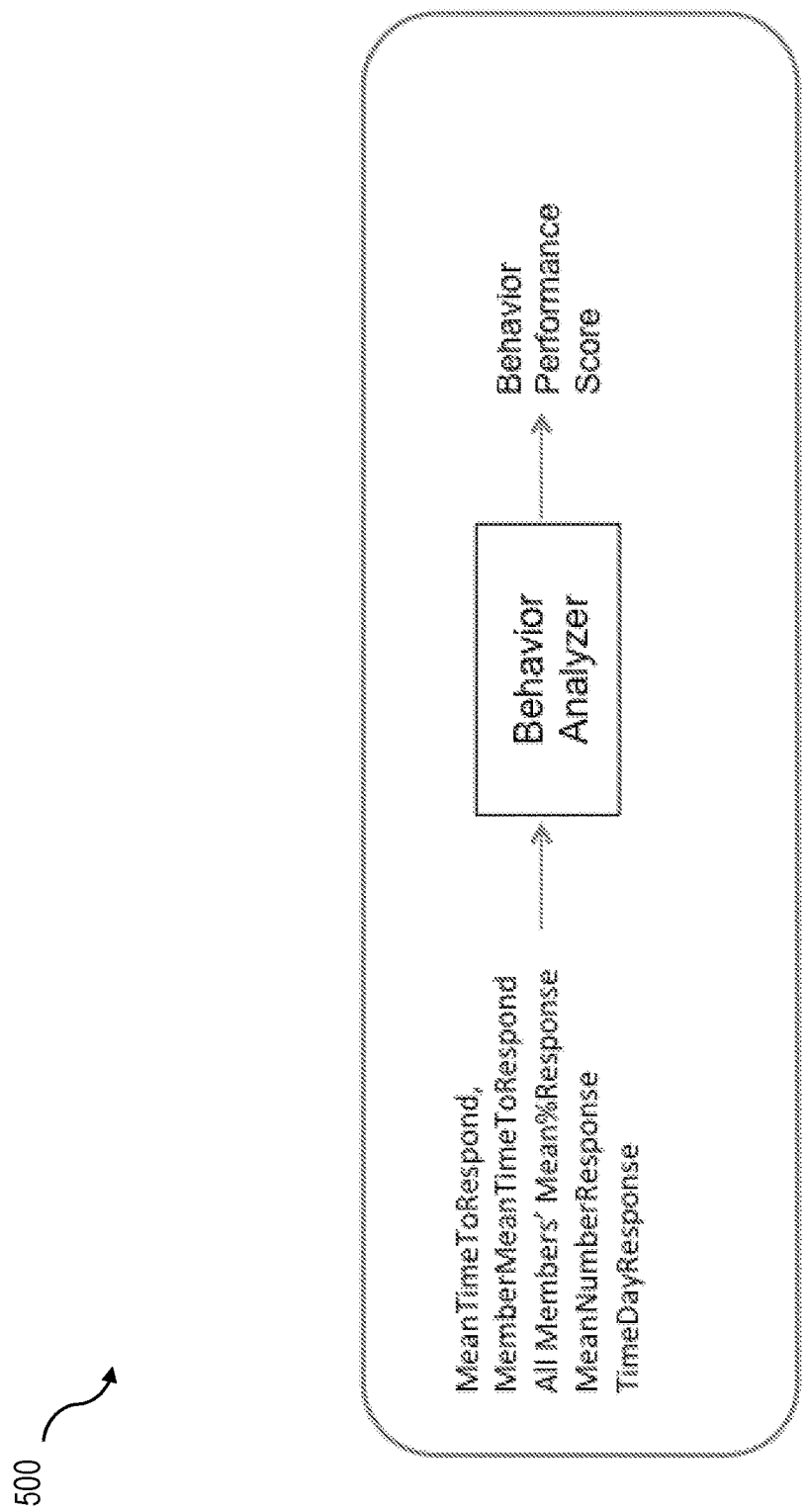
FIG. 5 is a diagram illustrating a behavior analyzer for generating a behavioral performance score.

FIG. 5 is a block diagram 500 illustrating an example of another psychographic monitoring agent that provides a behavioral performance score. A pattern analysis engine can perform mining (e.g., daily mining, etc.) on behavior variables such as mean time to respond, response ratio and time/day of response. The pattern analysis engine can identify frequent and recurring patterns and uses a "bag of patterns" (BoP) approach and feature selection techniques that identifies relationships between behavior pattern vectors and outcomes. The pattern mining will also be combined with visualization to show how certain behavior patterns are more closely associated with particular outcomes.

Communication agents are types of analytics agents that can be focused on the channel or communication and compliance associated with that channel. For example, the agents used to map data to the search vector attributes might address communication requirements such as TCPA compliance, language preferences, channel preference, frequency controls.

The content search vector 230 can be a combination of the responses from the analytical agents 220 that processed the member input vector 210 and generated several attributes. The content search vector 230 can comprise attributes ($a_i$) and associated attribute score ($S(a_i)$). The attribute score for a given attribute can be as follows:

$$S(a_i)=w(a_i)c(a_i)$$

where $w(a_i)$ is $a_i$'s weight determined by a weighting model described below. And $c(a_i)$ is the attribute's confidence generated by the analytical agent(s) 220.

The weighting for the weights within the content search vector model can be determined by a genetic algorithm in which the activation score can be used as the fitness measure. The goal is to select the content workflows that maximize (or increase) the value of the activation score. This consists of running multiple trials on the training set using an evaluation function and technique called "leaving-one-out" in which one exemplar at a time is withheld as a form of cross-validation. This speeds up the optimization process because many of the feature weights (where covariances are too small or too large) can be eliminated. This genetic algorithm evaluation function (sum of squares of errors on the training set) is also commonly used with backpropagation in neural networks. Updates to the weighting using the proposed genetic algorithm are performed infrequently—e.g., it is triggered every 3 months or when there is a significant negative shift in the population's activation score.

The selection process comprises taking a version of a proposed weighting algorithm and simulating the resulting fitness or activation score. The fitness measure can be computed by extrapolating activation from prior usage of content workflows and the resultant activation score.

| Attribute | Weight | Confidence | Attribute Score |
|---|---|---|---|
| 59 year | 5 | 5 | 25 |
| 55-65 year olds | 5 | 5 | 25 |
| Baby boomer | 5 | 4 | 20 |
| Low self-efficacy | 3 | 1 | 3 |
| SOC: Precontemplation | 4 | 3 | 12 |
| Low Activation | 3 | 2 | 6 |
| Medium engagement | 2 | 3 | 6 |
| Upset | 1 | 5 | 5 |
| Very Upset | 1 | 4 | 4 |

The content workflow search engine 240 can use the content search vector 230 to match the best content that optimally matches the search attributes with the attributes of the content workflows. Initially, a forward index can be developed to store the list of attributes and then it can be inverted to develop an inverted index. This arrangement reduces the time, memory and processing resources needed to perform a query and optimizes the process. A search engine indexing algorithm can be used which, in turn, can optimize the speed of the query. Attribute scores can be used to rank the resulting documents based on tags matched and the weights assigned to those tags.

In choosing the best content workflow for a particular member, an algorithm can match the content attributes of each message in the workflow (e.g., supportive, low health literacy, appropriate for all ages, targeting diabetics, nutrition-related, informational, no call to action) to the member attribute score (e.g., low-income, diabetic, low motivation to change, low confidence levels, interested in nutrition tips) to optimize the closest fit and drive engagement with the message content.

The model will always select at least one workflow that is a match for a particular member based on the highest matching attribute score. For each workflow and its corresponding content search vector, a distance calculation between the workflow and the member's content search vector can be used to select the best match workflow. The distance measure can be defined by the equation below:

$$d(c) = \sum_{n=1}^{N} w_n t_n \text{ where } t_n = \begin{cases} -1 \text{ if } s_n \notin \{c\} \\ 1 \text{ if } s_n \in \{c\} \end{cases}$$

where d(c) is the distance for the content workflow c is the set of search terms, $w_n$ is the content search vector weight for that attribute, $s_n$.

With each new piece of information (triggered event or scheduled event from the member), the member's content search vector can be re-computed and a new content workflow may be generated. Assignment of a new content workflow is determined by two factors: whether an existing workflow is complete, or the new suggested workflow is significantly better matched than the current workflow.

The content library 250 can contain a large content workflow library that can be used as the content source for all messages. Each message in the workflow library can be tagged with the attributes of the content. Messages and attributes associated with each message can be continuously updated as new content is generated. Cross-validation of attributes for a workflow can be done through various mechanisms including crowd-sourcing. Content workflows can be a combination of pre-existing open source or public domain content such as the National Cancer Institute's "smokefreeTXT" content or proprietary content libraries from clients and other sources.

The context engine 270 can be a computer program that executes a content workflow. This content workflow or "dialog" is similar to a finite state machine with states, actions and rules. Rules (including NLP-based, string matching-based rules, multi-predicate) determine which actions to perform in a given state. An action may include moving to a new state or sending a message to the member. States represent the context that a member has gone through (and is in) and is a way to ensure that complex dialogs and conversations are compelling and relevant to the member's current mental space.

Behavior pattern algorithms can be combined with the three components of the member input vector 210 (psychographic information 212, demographic information 214, and behavioral information 216) to generate a holistic and reliable activation metric. This metric can range, for example, from 1 to 100 where 100 is the highest level of activation a member can obtain. While this measure is an estimate, that is, it only computes a value of activation based on known data points, the member activation score can provide a uniform way to measure and track engagement and activation of individual members, campaigns, clients and system wide. In some implementations, an objective can be to increase this score for all members by presenting them with the most relevant and timely content workflows. This selection process is supported by adaptive learning and analytical models described above.

The member activation score can be provided as follows:

$$\text{ActivationScore} = w_{se}SE + w_{soc}SOC + w_{ic}IC + w_{bc}BC + w_eE$$

where: $w_{se}SE$—is a weighted scoring of the member's current Self Efficacy (SE) score. The SE score can be derived from responses to self-efficacy assessments that are completed by the member at recommended intervals. The SE score can also incorporate health belief profile data (i.e., self-reported perceptions of the severity of a health threat or illness, of susceptibility to that illness, of the benefits of taking preventive action, and of barriers to taking that action, etc.). The health belief model addresses the relationship between a person's beliefs and their behavior and predicts how likely individuals are to engage in healthy behaviors. The SE score can be normalized to a range of 1-10 (higher scores reflect higher self-efficacy).

$w_{soc}$SOC is a weighted scoring of the member's current Stage of Change. The Stage of Change can be based on Prochaska's Transtheoretical Model of Change which has 6 major stages of change. Each stage maps to a score from Stages of Change behavior. The SOC score can be derived from responses to assessments that determine a member's most likely stage of change. The SOC score is normalized to a range of 1-10 (higher scores represent a greater readiness to change).

$w_{ic}IC$ is a weighted scoring of the member's current Internal Change. This score can be derived from actions performed by the member towards the related behavioral goals aligned to the specific overall behavior change goals. For example, the Behavior Change (BC) goals or outcome variables for a diabetic may be to improve glycemic control or medication adherence, but related self-care behavioral goals or internal changes (IC) might incorporate diet and/or exercise. The score can be the cumulative value of individual positive behaviors performed by the member. The IC score can be normalized to a range of 1-10 (higher scores reflect the completion of more positive behaviors).

$w_{bc}BC$ is a weighted scoring of the member's current Behavior Change. This score can be derived from actions performed by the member towards the main behavior change goal (determined by the desired health outcome). The BC score can be normalized to a range of 1-10 (higher scores reflect greater completion of the behavioral goal).

$w_e E$ is a weighted scoring of the member's current Engagement level. This score can be based on how the consumer communicates and interacts with the mobile platform and can be compiled from response data (frequency of response, length of response, time of response, sentiment of response, text-ins for information, text-ins for challenges, etc.). The E score can be normalized to a range of 1-10 (higher scores reflect greater engagement).

Figure 6:
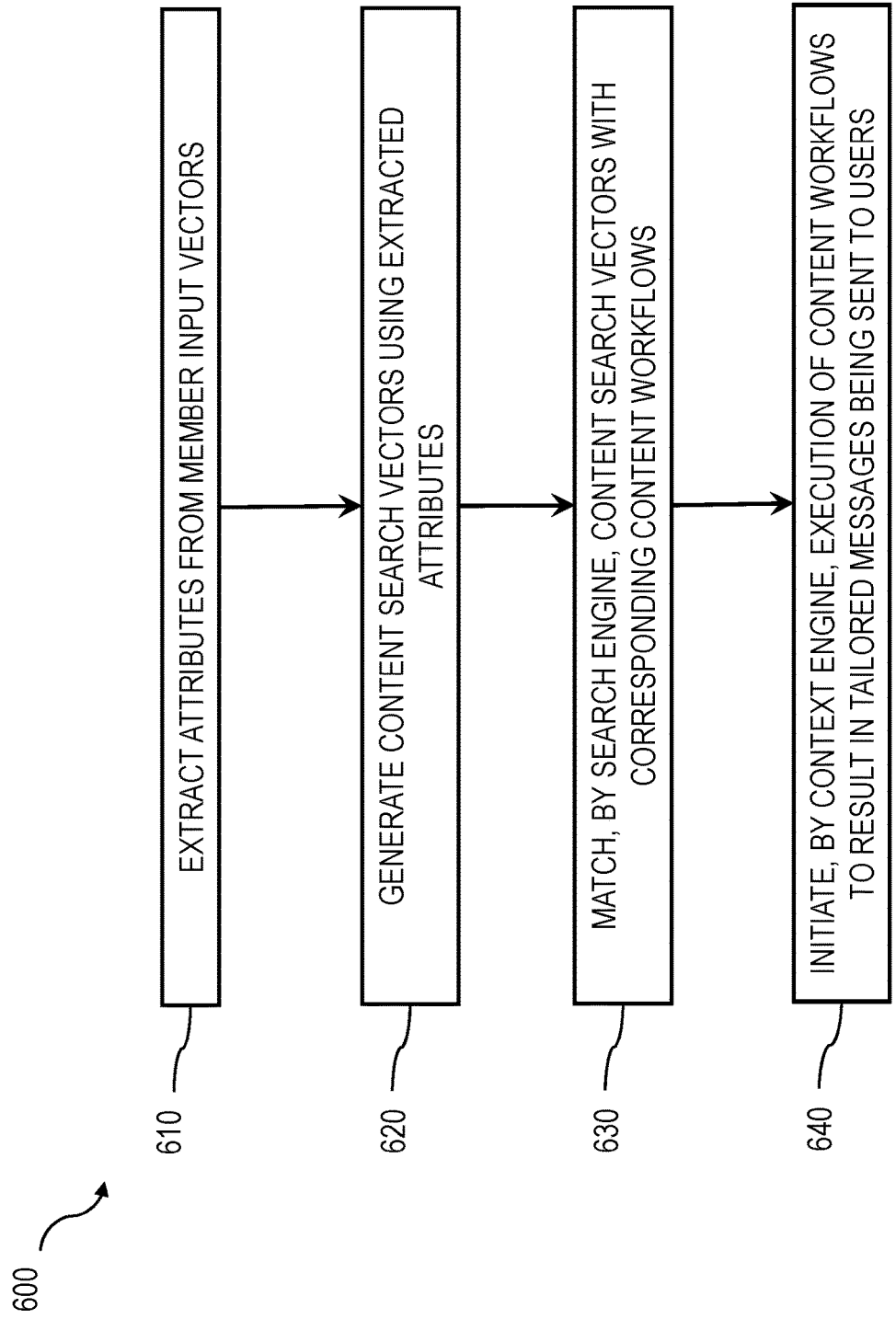
FIG. 6 is a process flow diagram illustrating generation of tailored messages to a large population of users.

FIG. 6 is a process flow diagram 600 illustrating the generation and delivery of tailored messages. Initially, at 610, at least one analytic agent extracts a plurality of attributes from each of a plurality of member input vectors. Each member input vector includes raw data characterizing contextual aspects about an associated and different user. Thereafter, at 620, a content search vector is generated for each user using the attributes extracted from the member input vector associated with such user and weights for each such attribute which are particular to the user. Next, at 630, a search engine matches each content search vector with a content workflow by accessing a content library and by using the weights. Next, at 640, a context engine initiates each content workflow which results in tailored messages specified by the content workflow being sent to the user associated with the content workflow.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, can include machine instructions for a programmable processor, and/or can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

The computer components, software modules, functions, data stores and data structures described herein can be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

Figure 7:
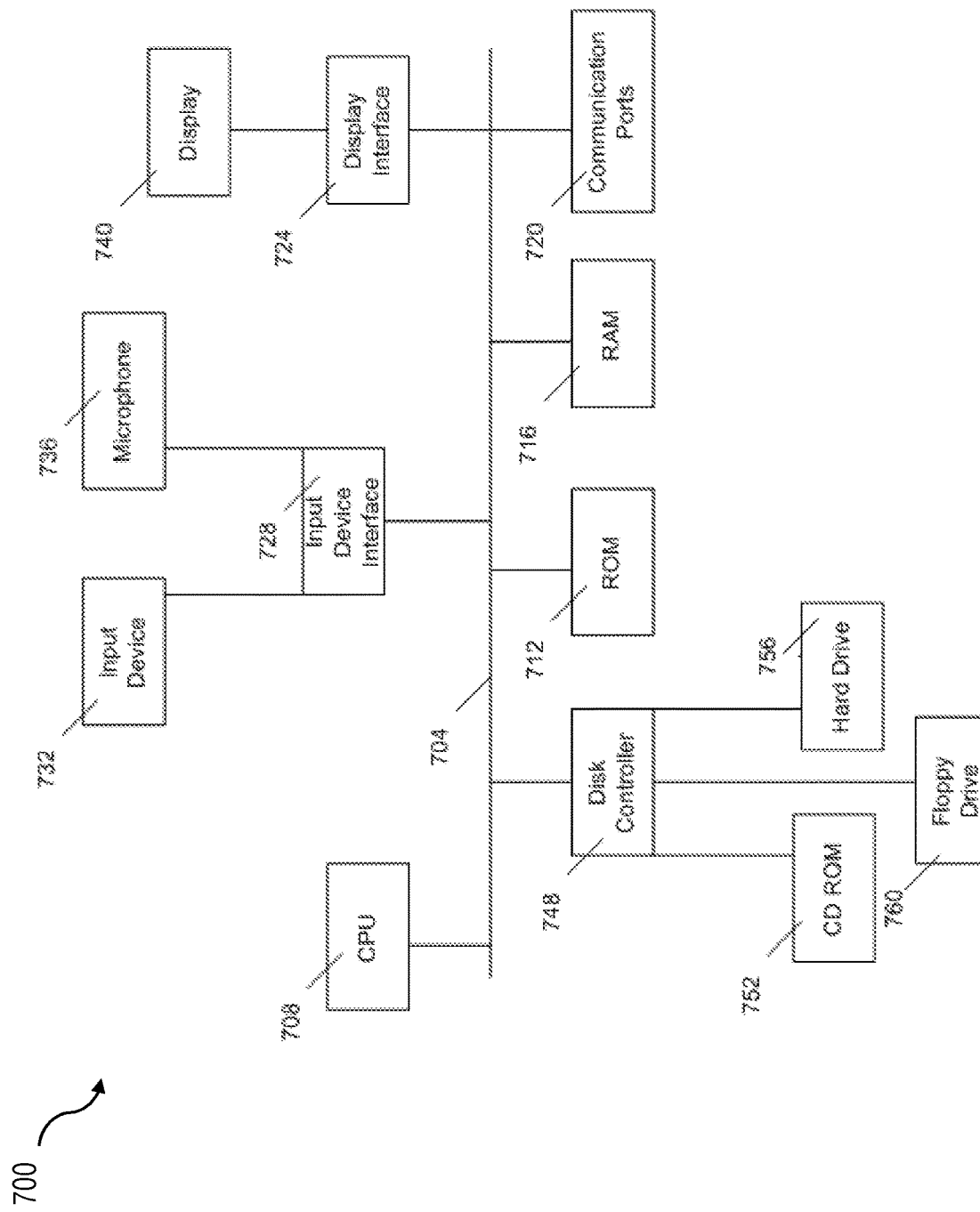
FIG. 7 is a diagram illustrating a computing device for implementing various aspects of the subject matter described herein.

FIG. 7 is a diagram illustrating a sample computing device architecture for implementing various aspects described herein. A bus 704 can serve as the information highway interconnecting the other illustrated components of the hardware. A processing system 708 labeled CPU (central processing unit) (e.g., one or more computer processors/data processors at a given computer or at multiple computers), can perform calculations and logic operations required to execute a program. A non-transitory processor-readable storage medium, such as read only memory (ROM) 712 and random access memory (RAM) 714, can be in communication with the processing system 708 and may include one or more programming instructions for the operations specified here. Optionally, program instructions may be stored on a non-transitory computer-readable storage medium such as a magnetic disk, optical disk, recordable memory device, flash memory, or other physical storage medium.

In one example, a disk controller 748 can interface one or more optional disk drives to the system bus 704. These disk drives may be external or internal floppy disk drives such as 760, external or internal CD-ROM, CD-R, CD-RW or DVD, or solid state drives such as 752, or external or internal hard drives 756. As indicated previously, these various disk drives 752, 756, 760 and disk controllers are optional devices. The system bus 704 can also include at least one communication port 720 to allow for communication with external devices either physically connected to the computing system or available externally through a wired or wireless network. In some cases, the communication port 720 includes or otherwise comprises a network interface.

To provide for interaction with a user, the subject matter described herein can be implemented on a computing device having a display device 740 (e.g., a CRT (cathode ray tube) or LCD (liquid crystal display) monitor) for displaying information obtained from the bus 704 to the user and an input device 732 such as keyboard and/or a pointing device (e.g., a mouse or a trackball) and/or a touchscreen by which the user may provide input to the computer. Other kinds of devices may be used to provide for interaction with a user as well; for example, feedback provided to the user may be any form of sensory feedback (e.g., visual feedback, auditory feedback by way of a microphone 736, or tactile feedback); and input from the user may be received in any form, including acoustic, speech, or tactile input. In the input device 732 and the microphone 736 can be coupled to and convey information via the bus 704 by way of an input device interface 728. Other computing devices, such as dedicated servers, can omit one or more of the display 740 and display interface 724, the input device 732, the microphone 736, and input device interface 728.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
    extracting, by at least one analytical agent for each of a plurality of different users, a plurality of attributes from each of a plurality of member input vectors, each member input vector comprising raw data characterizing contextual aspects about such user;
    generating, for each user by the at least one analytical agent, a content search vector comprising the attributes extracted from the member input vector associated with such user and weights corresponding to each attribute that are particular to such user;
    matching, by a search engine accessing a content library, each content search vector with one of a plurality of content workflows based on both the attributes and weights within such content search vector; and
    initiating, by a context engine, execution of each matching content workflow which results in tailored messages specified by the matching content workflow being sent to the user by at least one delivery modality associated with the matching content workflow, the tailored messages being directed to health plan members to build healthy habits and behaviors.

2. The method of claim 1, further comprising generating the member input vector for each user.

3. The method of claim 2, wherein attributes of the member input vector are subject to change and the extracting, generating, matching, and initiating are updated to reflect changes in the member input vector.

4. The method of claim 3, wherein a dimensionality of the member input vector is automatically expanded upon addition of one or more data sources without refactoring other data sources.

5. The method of claim 1, further comprising:
    receiving, for each user, a plurality of responses to tailored messages previously sent to such user;
    performing computer-implemented natural language processing on the plurality of responses to generate at least a portion of the attributes of each member input vector.

6. The method of claim 1, wherein each content workflow is stored within a database and specifies a sequence, modality, and delivery flow of the tailored messages.

7. The method of claim 6, wherein the modality comprises at least one of: short messaging service, multimedia messaging service, application notification, or e-mail message.

8. The method of claim 1, wherein there are a plurality of analytical agents and at least one analytical agent uses an output of at least one other analytical agent in connection with the extracting and generating.

9. The method of claim 1, wherein there are a plurality of analytical agents that each evaluate only a subset of dimensions of the member input vector and which generate only a different subset of the attributes.

10. The method of claim 1, wherein the at least one analytical agent comprises a natural language processing agent to extract key topics from a user-generated response and which uses a machine learning model.

11. The method of claim 1, wherein the at least one analytical agent comprises a mapping agent that runs data mapping rules to map data falling within a range into attribute.

12. The method of claim 1, wherein the at least one analytical agent comprises a classification agent using random forests to classify continuous feature vectors with a finite set of classes.

13. The method of claim 1, wherein the at least one analytical agent comprises an emotion recognition agent that takes individual messages and generates an emotional profile of the messages.

14. The method of claim 1, wherein the at least one analytical agent comprises a psychographic monitoring agent that translates user generated self-reports or provided outcomes obtained from external sources to generate a psychographic profile for a user.

15. The method of claim 1 further comprising:
generating a forward index to store a list corresponding to all of the attributes;
inverting the forward index to result in an inverted index, the inverted index being used by the search engine to match attributes of the content search vector with attributes of the content workflows.

16. The method of claim 1 further comprising:
generating an activation score for each attribute in each content search vector;
wherein the matching by the search engine utilizes the generated activation scores to identify a best matching content workflow.

17. The method of claim 16, wherein the tailored messages pertain to a healthcare and/or wellness regimen.

18. The method of claim 17, wherein the activation score is based on a self efficacy score derived from responses by the respective user of self-efficacy assessments.

19. The method of claim 17, wherein the activation score is based on a state of change of the respective user.

20. The method of claim 17, wherein the activation score is based on a current internal change of the respective user that characterizes actions performed by the respective user in relation to overall behavior change goals.

21. The method of claim 17, wherein the activation score is based on a current behavior change of the respective user that characterizes actions performed by the respective user in relation to overall behavior change goals.

22. The method of claim 17, wherein the activation score is based on a current engagement level of the respective user characterizing how the user responds to the tailored messages.

23. The method of claim 1 further comprising:
determining, for each content search vector, a distance between the content search vector and each of a plurality of content workflows;
wherein the matching by the search engine is based on the content workflow having a shortest determined distance relative to the corresponding content search vector.

24. The method of claim 1, wherein each content workflow comprises a plurality of messages that are each tagged with respective attributes characterizing content of such messages.

25. The method of claim 16, wherein each content workflow comprises a content matching algorithm that uses a content search vector that has weights that are determined by a genetic algorithm wherein a fitness measure for optimization is the resulting activation score.

26. A computer-implemented method for increasing compliance with a healthcare/wellness regimen, the method comprising:
extracting, for each of a plurality of different users, a plurality of attributes from each of a plurality of member input vectors, each member input vector comprising raw data characterizing contextual aspects about such user;
generating, for each user, a content search vector comprising the attributes extracted from the member input vector associated with such user and weights corresponding to each attribute that are particular to such user;
matching, by accessing a content library, each content search vector with one of a plurality of content workflows based on both the attributes and weights within such content search vector, the content workflows relating to compliance with the healthcare/wellness regiment; and
initiating execution of each matching content workflow which results in tailored messages specified by the matching content workflow being sent to the user by at least one delivery modality associated with the matching content workflow, the tailored messages being directed increasing compliance with the healthcare/wellness regimen.

27. A computer-implemented method comprising:
extracting, for a user, a plurality of attributes from each of a plurality of member input vectors, each member input vector comprising raw data characterizing contextual aspects about the different user;
generating, for the user, a content search vector comprising the attributes extracted from the member input vector associated with the user and weights corresponding to each attribute that are particular to the user;
matching, by a search engine accessing a content library, each content search vector with one of a plurality of content workflows based on both the attributes and weights within such content search vector; and
initiating, by a context engine, execution of each matching content workflow which results in tailored messages specified by the matching content workflow being sent to the user, the matching content workflows each specifying a different sequence, modality, and delivery flow of the tailored messages.

* * * * *